(12) United States Patent
Katsuki

(10) Patent No.: US 7,173,266 B2
(45) Date of Patent: Feb. 6, 2007

(54) ULTRAVIOLET IRRADIATING DEVICE

(75) Inventor: Kazumitsu Katsuki, Osaka (JP)

(73) Assignee: Keyence Corporation, Osaka (JP)

( * ) Notice: Subject to any disclaimer, the term of this patent is extended or adjusted under 35 U.S.C. 154(b) by 7 days.

(21) Appl. No.: 10/860,598

(22) Filed: Jun. 4, 2004

(65) Prior Publication Data
US 2005/0023488 A1    Feb. 3, 2005

(30) Foreign Application Priority Data
Jun. 4, 2003  (JP) .............................. 2003-158958
Dec. 26, 2003 (JP) .............................. 2003-435369

(51) Int. Cl.
    *G01N 21/33* (2006.01)
(52) U.S. Cl. .............................. 250/504 R; 250/504 H; 250/365
(58) Field of Classification Search ............ 250/504 R, 250/504 H, 200
    See application file for complete search history.

(56) References Cited

U.S. PATENT DOCUMENTS

| | | | | |
|---|---|---|---|---|
| 3,970,856 A | * | 7/1976 | Mahaffey et al. ........ 250/493.1 |
| 5,569,983 A | * | 10/1996 | McGuire et al. ............ 315/297 |
| 5,822,053 A | * | 10/1998 | Thrailkill ................ 356/237.1 |
| 6,043,294 A | * | 3/2000 | Hed .............................. 522/1 |
| 6,573,984 B2 | * | 6/2003 | Jung et al. ...................... 356/73 |
| 6,692,250 B1 | * | 2/2004 | Decaudin et al. ............. 433/29 |
| 6,695,614 B2 | * | 2/2004 | Plank ........................... 433/29 |
| 6,871,951 B2 | * | 3/2005 | Blum et al. .................. 351/159 |
| 2004/0061069 A1 | * | 4/2004 | Schalble et al. ........ 250/432 R |
| 2004/0079903 A1 | * | 4/2004 | Sosinsky ................ 250/504 R |
| 2004/0135159 A1 | * | 7/2004 | Siegel .......................... 257/88 |
| 2004/0152038 A1 | * | 8/2004 | Kumagai et al. ............. 433/29 |
| 2005/0083687 A1 | * | 4/2005 | Brass et al. ................ 362/231 |

FOREIGN PATENT DOCUMENTS

| | | |
|---|---|---|
| JP | 62-22604 U | 2/1987 |
| JP | 5-305259 A | 11/1993 |
| JP | 09-187825 A | 7/1997 |
| JP | 9-204050 A | 8/1997 |
| JP | 10-190058 A | 7/1998 |
| JP | 2001-250409 A | 9/2001 |
| JP | 2003-89555 A | 3/2003 |
| JP | 2003-133301 A | 5/2003 |
| JP | 2004-508162 A | 3/2004 |
| JP | 2005-70190 A | 3/2005 |
| WO | WO 02/12127 A | 2/2002 |

* cited by examiner

*Primary Examiner*—Nikita Wells
(74) *Attorney, Agent, or Firm*—Smith Patent Office

(57) ABSTRACT

In an ultraviolet irradiating device in which a controller section and plural head portions used to cure ultraviolet curable resin used in the adhesion of a part are connected by an electric cable, each of the plural head portions has a sleeve-shaped housing and a light emitting diode which is arranged within this housing and emits a near-ultraviolet ray. The ultraviolet irradiating device is constructed such that the near-ultraviolet ray emitted from the light emitting diode is irradiated to the exterior from a near-ultraviolet ray irradiating port arranged on the tip face of the housing. The controller section has a power circuit and a control circuit for individually controlling the operations of the light emitting diodes of the plural head portions.

27 Claims, 13 Drawing Sheets

ULTRAVIOLET IRRADIATING DEVICE

BACKGROUND OF THE INVENTION

The present invention relates to an ultraviolet irradiating device in which plural head portions which is used to cure ultraviolet curable resin used to adhere a small article part and a controller section are connected by an electric cable.

The ultraviolet curable resin is widely used from the fields of formation and printing of a resist film to the field of adhesive fixation of the small article part in an assembly process of an optical pickup, etc. The ultraviolet curable resin is generally designed so as to be cured by irradiating a near-ultraviolet ray near 365 nm in wavelength. However, a phenomenon (so-called oxygen obstruction) for obstructing a curing reaction of the resin by binding an oxygen molecule to a resin molecule is generated near the surface of the resin coming in contact with the air. Therefore, an ultraviolet ray (of a short wavelength) having large energy for overcoming this generation is required. Namely, it is known that the surface and inside of the resin are uniformly cured if the ultraviolet ray of a short wavelength (e.g., about 254 nm) for separating the oxygen molecule and the resin molecule from each other is irradiated together with the near-ultraviolet ray of about 365 nm in wavelength.

A mercury xenon lamp is generally used in a light source in the ultraviolet irradiating device used to cure the ultraviolet curable resin. The wavelength of the ultraviolet ray emitted from the mercury xenon lamp lies in a wide area of 200 to 600 nm. Accordingly, its short wavelength component contributes to the curing near the surface of the resin so that a comparatively uniform cured state is obtained.

Further, even when the ultraviolet irradiating device using the mercury xenon lamp is used, the ultraviolet ray is irradiated to the resin within the atmosphere of nitrogen as an inactive gas to promote the curing of the resin by restraining a bad influence of the oxygen molecule particularly near the surface of the resin. Namely, for example, a method for irradiating the ultraviolet ray to the ultraviolet curable resin within a chamber filled with nitrogen gas is executed as described in patent literature 1.

The ultraviolet irradiating device described in the patent literature 1 is large-sized production equipment used in the fields of formation and printing of the resist film. A compacter structure is used in the ultraviolet irradiating device used to adhere the small article part (e.g., plastic lens) in the assembly process of an optical pickup, etc. For example, a structure obtained by connecting a device main body building-in a light source using the mercury xenon lamp and a compact head portion by an optical fiber cable is used. The ultraviolet ray emitted from the mercury xenon lamp is guided to the head portion through the optical fiber cable, and is irradiated to an adhering portion coated with resin from the head portion.

Further, for example, when the outer circumferential portion of the plastic lens is fixed to its holder, it is necessary to coat plural contacting portions (e.g., three to four portions) of the outer circumferential portion of the plastic lens and the holder with the ultraviolet curable resin, and simultaneously fix the plural contacting portions. Namely, it is necessary to simultaneously cure the resin of the plural contacting portions. This is because the accuracy of a fixing position of the plastic lens gets worse when the resin is sequentially cured every one portion.

Therefore, the above ultraviolet irradiating device for adhering the small article part has plural heads and has a structure in which the device main body and the plural head portions are respectively connected by plural optical fiber cables. One mercury xenon lamp is built in the device main body, and the ultraviolet irradiating device is constructed such that the ultraviolet ray emitted from the mercury xenon lamp is simultaneously incident to the plural optical fiber cables. The ultraviolet rays propagated within the respective optical fiber cables are simultaneously irradiated to the exterior from the head portions connected to the tips of the respective optical fiber cables.

[Patent literature 1] JP-A-5-305259

Since a heat ray is also included in the ultraviolet ray emitted from the above mercury xenon lamp, the heat ray is shielded by using a filter. However, for example, in a use for adhering and fixing a precise optical part such as a microplastic lens, there are fears that heat included in the irradiated ultraviolet ray badly affects the fixation accuracy of the part and the precise part is distorted by the heat.

Further, a member obtained by coating a quartz optical fiber with a flexible cable of stainless steel is used in the optical fiber cable for guiding the ultraviolet ray emitted from the mercury xenon lamp to the head portion. However, this optical fiber cable is expensive and attenuation of the ultraviolet ray is large. Therefore, a problem exists in that no ultraviolet ray can be guided until a far place.

Further, as mentioned above, the structure for propagating the ultraviolet ray emitted from one mercury xenon lamp in the plural optical fiber cables and irradiating the ultraviolet ray from the plural heads is used. Therefore, the intensity (light amount) of the ultraviolet ray irradiated from each head and on-off timing of the irradiation cannot be individually controlled.

In recent years, a light emitting diode (LED) of high output is practically used as the light source of the ultraviolet ray instead of a high pressure mercury lamp and the mercury xenon lamp. If this light emitting diode is built in the head portion as the light source, the above problems can be solved at a stroke.

SUMMARY OF THE INVENTION

A main object of the present invention is to provide an ultraviolet irradiating device for adhesion of part, which is compact and is cheaply manufactured and is excellent in operability by building the light emitting diode in the head portion as a light source.

Further, when the light emitting diode emitting a near-ultraviolet ray is used as the light source, its light emitting wavelength area is very narrow as at e.g., 380±10 nm, and no ultraviolet ray of a short wavelength component near 200 nm can be emitted as in the mercury xenon lamp. Therefore, as mentioned above, the oxygen molecule is bound to the resin molecule near the surface of resin coming in contact with the air, and the curing reaction of the resin is obstructed. As a result, the phenomenon (so-called surface tack) that the interior of the resin is cured but no resin is cured on its surface, is generated.

Another object of the present invention is to provide an ultraviolet irradiating device able to effectively improve the phenomenon in which no resin is easily cured on its surface while the light emitting diode is used as the light source.

The ultraviolet irradiating device (claim 1) of the present invention is an ultraviolet irradiating device in which a controller section and plural head portions used to cure ultraviolet curable resin are connected by an electric cable, wherein each of the plural head portions has a housing and a light emitting diode which is arranged within this housing and emits a near-ultraviolet ray, and the ultraviolet irradiating device is constructed such that the near-ultraviolet ray emitted from the light emitting diode is irradiated to the exterior from a near-ultraviolet ray irradiating port arranged on the tip face of the housing, and the controller section has a power circuit and a control circuit for individually controlling the operations of the light emitting diodes of the plural head portions.

In a preferable embodiment mode (claim 2), each of the plural head portions further has a gas flow passage arranged within the housing, and a gas injection port arranged on the tip face of the housing, and an inactive gas supplied from a base end face of the housing is injected from the near-ultraviolet ray irradiating port to the exterior through the gas flow passage.

In another preferable embodiment mode (claim 3), the controller section has one inactive gas input port, plural inactive gas output ports, and a branch connecting pipe for branching and connecting the inactive gas input port and the plural inactive gas output ports, and the inactive gas supplied from a supply source of the inactive gas is supplied to the plural head portions through the controller section.

In still another preferable embodiment mode (claim 4), the controller section further has an electromagnetic valve for individually controlling opening and closing of the plural inactive gas output ports.

The ultraviolet irradiating device (claim 1) in the present invention can be made compact and can be cheaply constructed in comparison with the conventional ultraviolet irradiating device in which the head portion and the device main body are connected by an optical fiber cable by using a mercury xenon lamp as a light source. Further, since the head portion and the controller portion are connected by the electric cable, the head portion can be drawn around until a portion separated from the controller section. Further, the intensity of the near-ultraviolet ray irradiated from each head and on-off timing can be individually controlled by an electric signal from the controller section.

In accordance with a preferable embodiment mode (claim 2), the air near the resin surface is expelled by the inactive gas injected from the head portion, and the density of an oxygen molecule is reduced. Accordingly, the phenomenon of obstructing the curing reaction of the resin by binding the oxygen molecule to a resin molecule is restrained or relaxed. As its result, the effect of approximately uniformly curing the resin surface together with the interior of the resin is obtained. Further, the effect of cooling the generation heat of the light emitting diode by the inactive gas flowed in the housing interior (gas flow passage) of the head portion is also obtained. The light emitting diode emitting the near-ultraviolet ray has large self generation heat in comparison with the light emitting diode emitting normal visible light, and its life is shortened in the case of insufficient heat radiation. However, long life can be secured by the above cooling effect.

In accordance with another preferable embodiment mode (claim 3), it is sufficient to simply connect each of the plural head portions to the controller section, and make the connection with a supply source (e.g., nitrogen gas generator) of the inactive gas in only one portion of the controller section. Since the branch connecting pipe is built in the controller section, it is not necessary to arrange the branch connecting pipe externally attached and required when the plural head portions are directly connected to the supply source of the inactive gas.

In accordance with still another preferable embodiment mode (claim 4), the supply of the inactive gas to the plural head portions can be individually controlled. Namely, timing for injecting the inactive gas from each head portion can be individually controlled.

BEST MODE FOR CARRYING OUT THE INVENTION

The embodiments of the present invention will next be explained with reference to the drawings.

[Embodiment 1]

Figure 1:
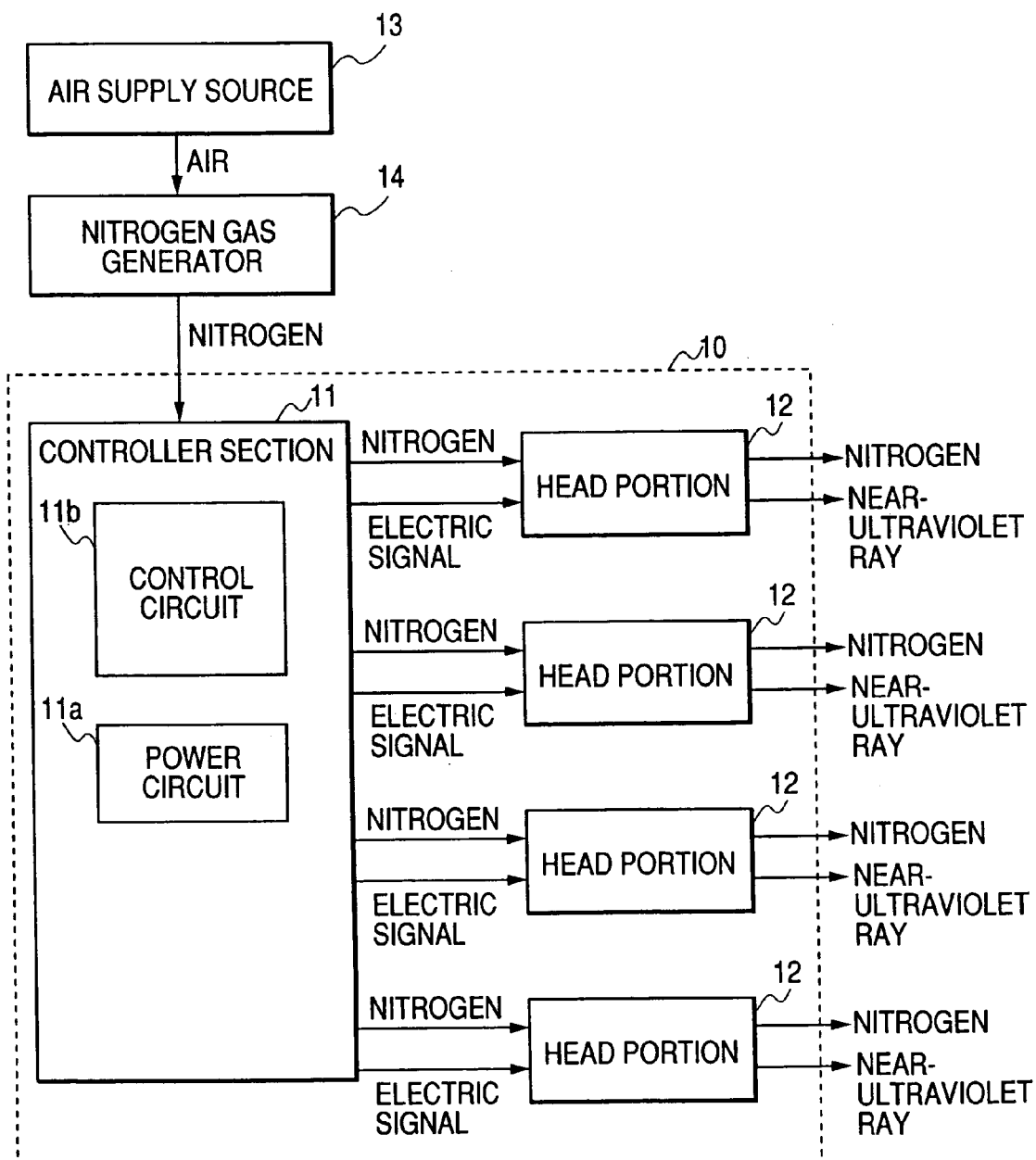
FIG. 1 is a block diagram showing a constructional example of a resin curing system including an ultraviolet irradiating device in accordance with an embodiment 1 of the present invention.

FIG. 1 is a block diagram showing a constructional example of a resin curing system including an ultraviolet irradiating device in accordance with an embodiment 1 of the present invention. This resin curing system uses an ultraviolet irradiating device 10 constructed by a controller section 11 and plural head portions 12, an air supply source 13 and a nitrogen gas generator 14.

Air piping can be used as the air supply source 13 in the case of the interior of a factory. A compressor may be directly connected to the nitrogen gas generator 14. The nitrogen gas generator 14 can use a nitrogen gas generator sold at a market and having a system for separating the air into nitrogen and the oxygen enrichment air by a hollow separating film. For example, such a nitrogen gas generator is generally used to prevent oxidation in soldering, heat treatment, etc.

The nitrogen gas from the nitrogen gas generator 14 is supplied to the controller section 11 of the ultraviolet irradiating device 10, and is supplied to the plural head portions 12 through a branch connecting pipe and an electromagnetic valve as described later. The nitrogen gas is then injected from a gas injection port arranged on the tip face of the head portion 12.

Figure 2:
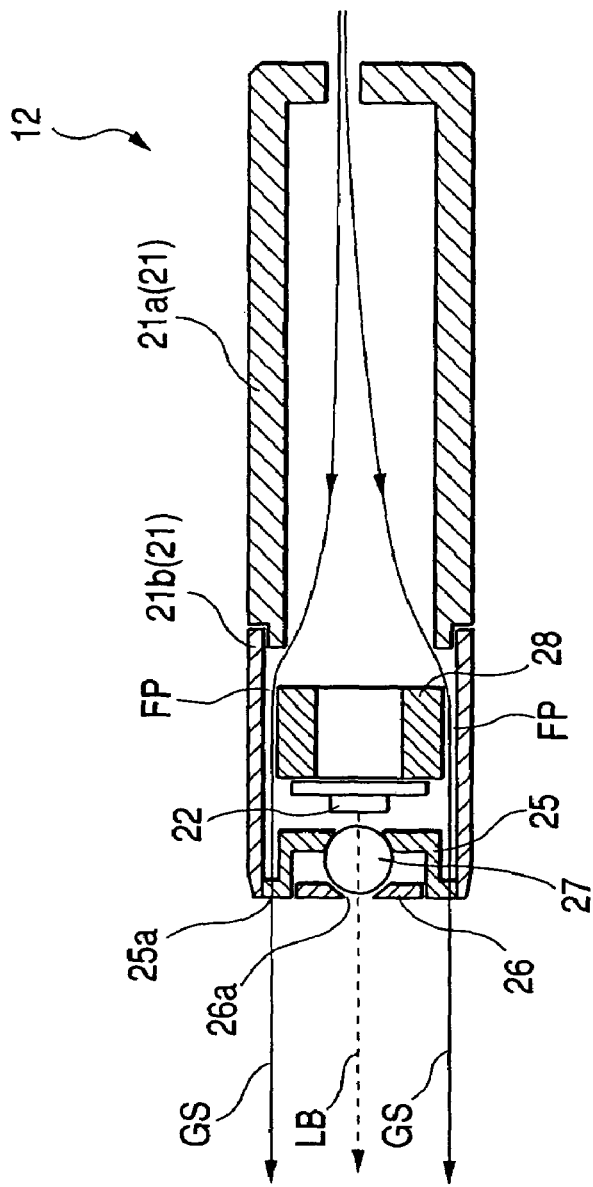
FIGS. 2A and 2B are views showing the schematic structure of a head portion of the ultraviolet irradiating device of the embodiment 1.
Figure 3:
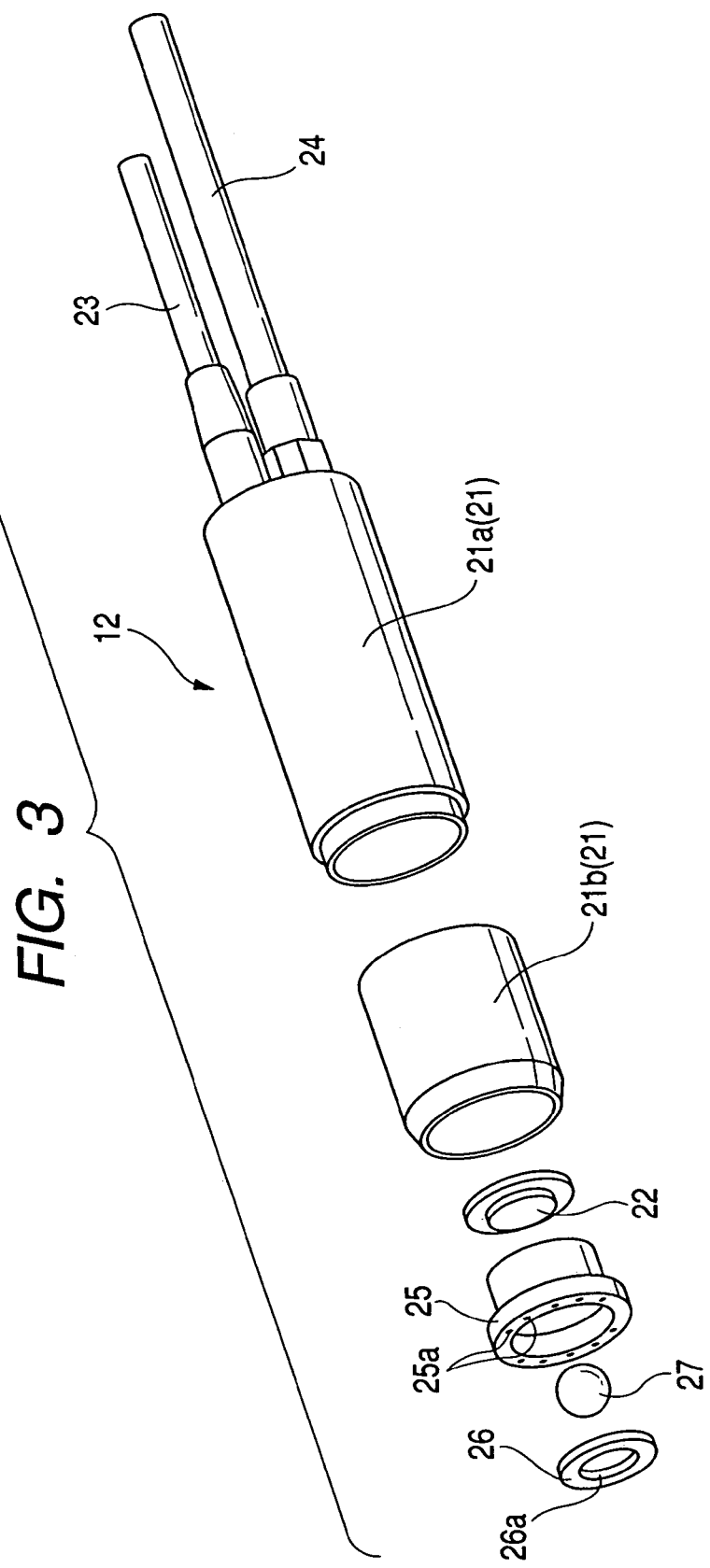
FIG. 3 is an exploded perspective view of the head portion of the ultraviolet irradiating device of the embodiment 1.

FIG. 2 is a view showing the schematic structure of each head portion 12 of the ultraviolet irradiating device 10. FIG. 2A is a front view of this schematic structure, and FIG. 2B is a cross-sectional view of the schematic structure. FIG. 3 is an exploded perspective view of the head portion 12 of the ultraviolet irradiating device 10. The head portion 12 of the ultraviolet irradiating device 10 has a hollow cylindrical housing 21 having a size able to be approximately gripped by an operator. A light emitting diode (LED) 22 emitting a near-ultraviolet ray is arranged within this housing 21. The LED 22 is operated by an electric signal from the controller section 11 and emits the near-ultraviolet ray near 380 nm in wavelength.

The controller section 11 has a power circuit 11a and a control circuit 11b for individually controlling the operation of the LED 22 of each head portion 12 (see FIG. 1). A driving signal (electric signal) of the LED 22 is transmitted to each head portion 12 through an electric cable (wire harness).

As shown in FIGS. 2 and 3, the housing 21 of each head portion 12 is constructed by a base end side member 21a and a tip side member 21b and is integrated by screwing both the base end side member 21a and the tip side member 21b. For example, the housing 21 (the base end side member 21a and the tip side member 21b) is manufactured by cutting processing from an aluminum block. A wire harness 23 for electrically connecting the controller section 11 and the head portion 12, and a tube 24 of nitrogen gas supplied from the nitrogen gas generator 14 through the controller section 11 are connected to the base end portion of the housing 21 (base end side member 21a) (see FIG. 3).

A hollow cylindrical member 25 is fixed to the tip portion of the housing 21 by screwing. A cap member 26 of an annular shape is fixed to the inside of this hollow cylindrical member 25 by screwing. As shown in FIG. 2B, a lens 27 is held as to be nipped between the hollow cylindrical member 25 and the cap member 26. Further, a round hole (near-ultraviolet ray irradiating port) 26a is formed in the central portion of the cap member 26, i.e., in the central portion of the tip face 21F of the housing 21. As shown by the arrow line LB of a broken line in FIG. 2B, the near-ultraviolet ray emitted from the LED 22 is irradiated to the exterior from the near-ultraviolet ray irradiating port 26a of the central portion of the cap member 26 through the lens 27.

Plural (ten in FIG. 2A) small holes (gas injection ports) 25a are arranged on the tip face 21F of the housing 21 so as to surround the circumference of the near-ultraviolet ray irradiating port 26a in an annular shape. Namely, these gas injection ports 25a are formed along the annular tip face of the hollow cylindrical member 25 screwed to the tip portion of the housing 21, and communicate the internal space and the external space of the housing 21.

Further, a substrate of the LED 22 and a cylindrical support member 28 of an aluminum block for supporting this substrate are arranged within the housing 21. The cylindrical support member 28 is arranged in a coaxial shape with respect to the tip side member 21b constituting the housing 21 of a cylindrical shape. A gas flow passage FP of an annular shape in section is formed between the inner circumferential face of the tip side member 21b and the outer circumferential face of the cylindrical support member 28.

As shown by the arrow line GS of a solid line in FIG. 2B, the nitrogen gas supplied from the nitrogen gas tube 24 into the housing 21 is injected to the exterior from the plural gas injection ports 25a formed on the annular tip face (tip face of the housing 21) of the hollow cylindrical member 25 through the gas flow passage FP of the annular shape in section.

In accordance with such a structure, the effect of cooling the LED 22 by the nitrogen gas passing through the gas flow passage FP is obtained. The LED (light emitting diode) emitting the near-ultraviolet ray has large self generation heat in comparison with the LED emitting the normal visible light, and its life is shortened when heat radiation is insufficient. However, a long life can be secured by the above cooling effect.

The near-ultraviolet ray is irradiated to ultraviolet curable resin by using the ultraviolet irradiating device having the head portion 12 of the above structure, and the nitrogen gas can be simultaneously injected to its irradiating portion. The air near the resin surface is expelled by the nitrogen gas and the density of an oxygen molecule is reduced. Accordingly, the phenomenon of obstructing the curing reaction of the resin by binding the oxygen molecule to a resin molecule is restrained or relaxed. As its result, the effect of approximately uniformly curing the resin surface together with the resin interior is obtained.

The LED 22 as a light source is built in the head portion 12, and the head portion 12 and the controller section 11 are connected by the electric cable (wire harness) 23. Accordingly, the head portion 12 can be drawn around until a portion separated from the controller section 11. Thus, the ultraviolet irradiating device can be made compact and cheaply constructed in comparison with the conventional ultraviolet irradiating device in which the mercury xenon lamp is built in the device main body as a light source and the device main body and the head portion are connected by the optical fiber cable.

Figure 4:
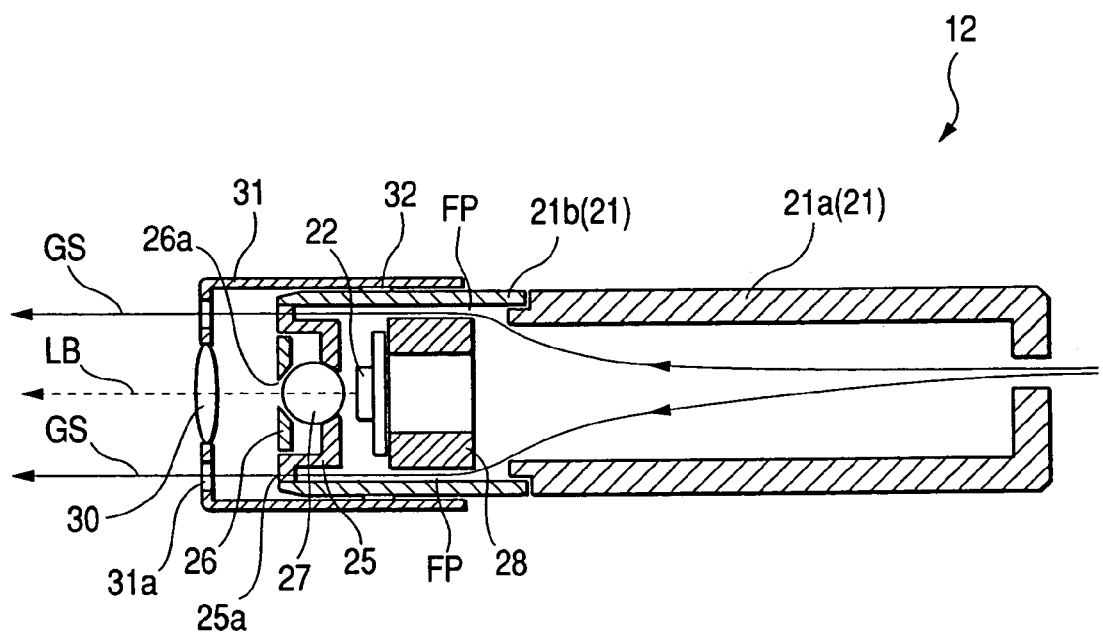
FIG. 4 is a cross-sectional view showing a schematic structure in a modified example of the head portion of the ultraviolet irradiating device of the embodiment 1.

FIG. 4 is a cross-sectional view showing a schematic structure in a modified example of the head portion 12 of the ultraviolet irradiating device 10. In this example, a lens holder 31 mounting a second lens 30 thereto is attached to a tip side member 21b of a housing 21 so as to be covered. A screw is formed in one portion of the inner circumferential face of the lens holder 31 and one portion of the outer circumferential face of the tip side member 21b (a screw portion 32 in FIG. 4). The lens holder 31 is detachably screwed to the tip side member 21b.

In accordance with such a structure, as shown by the arrow line LB of a broken line in FIG. 4, the near-ultraviolet ray emitted from the LED 22 is irradiated to the exterior through a first lens 27 and the second lens 30. The irradiating angle (widening angle) of the near-ultraviolet ray can be changed by exchanging the plural lens holders 31 mounting the lenses 30 of different focal lengths thereto.

The ultraviolet irradiating device can be also constructed such that a base end portion of the optical fiber is mounted to the lens holder 31 instead of the second lens 30 and the near-ultraviolet ray emitted from the LED 22 is incident to the optical fiber through the lens 27. In this case, the near-ultraviolet ray is propagated within the optical fiber, and is irradiated from its tip portion to the exterior.

Further, after the nitrogen gas passes through a first gas injection port 25a formed in a hollow cylindrical member 25, the nitrogen gas further passes through a second gas injection port 31a formed in the lens holder 31 and is injected to the exterior. In this case, if the lens holder 31 is rotated, the distance between the first gas injection port 25a and the second gas injection port 31a and their position relation (overlapping degree seen from the tip face) are changed. Thus, the widening of the injection of the nitrogen gas to the exterior is changed. Namely, the injection method (widening angle) of the nitrogen gas to the exterior can be adjusted by rotating the lens holder 31.

In each of the structures shown in FIGS. 2B and 4, the lens 27 can be detached and exchanged if a cap member 26 screwed to the hollow cylindrical member 25 is rotated and detached from the hollow cylindrical member 25. Further, the LED 22 can be detached and exchanged if the hollow cylindrical member 25 screwed to the tip side member 21b of the housing 21 is rotated and detached from the tip side member 21b.

Figure 5A:
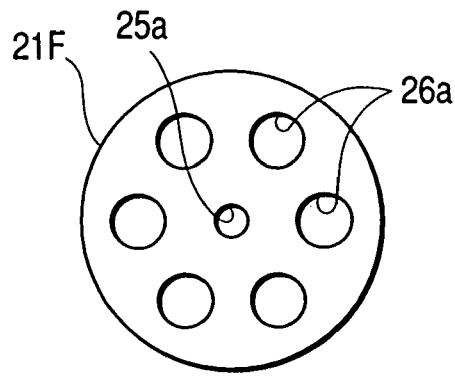
FIGS. 5A to 5C are views showing other modified examples of the head portion of the ultraviolet irradiating device of the embodiment 1.

FIG. 5 is a view showing another modified example of the head portion 12 of the ultraviolet irradiating device 10. In the example shown in FIG. 5A, a gas injection port 25a is arranged in the central portion of the tip face 21F of the housing 21. Plural (six in the illustrated example) near-ultraviolet ray irradiating ports 26a are arranged so as to surround the circumference of this gas injection port 25a in an annular shape. A gas flow passage of the nitrogen gas is arranged in the central portion within the housing 21 correspondingly to this arrangement. Plural (six) LEDs are arranged so as to surround this gas flow passage in the annular shape (not shown in FIG. 5).

In the structure of this example, the irradiating amount of the near-ultraviolet ray can be increased by using the plural light emitting diodes in accordance with necessity. A cooling effect using the nitrogen gas passing the central portion of the plural LEDs arranged in the annular shape is also obtained.

Figure 5B:
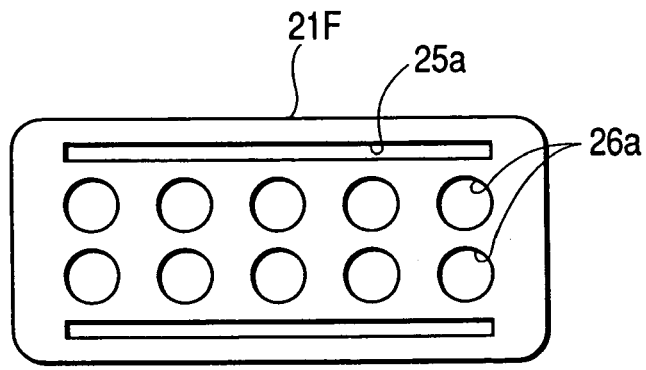

In the example shown in FIG. 5B, the head portion has a housing approximately formed in a rectangular parallelepiped shape. Plural near-ultraviolet ray irradiating ports 26a are arranged along the long side direction of the tip face 21F of the rectangular shape of the housing. Further, a gas injection port 25a of a slit shape is arranged along the long side direction.

In the illustrated example, ten near-ultraviolet ray irradiating ports 26a in total are arranged in two lines, and two gas injection ports 25a of the slit shape in total are formed on both sides of these near-ultraviolet ray irradiating ports 26a such that one gas injection port 25a is formed on each of both the sides. Plural near-ultraviolet ray irradiating ports 26a may be also arranged in one line, and may be also arranged in three lines or more. Further, only one gas injection port 25a of the slit shape may be also arranged on one side. Plural LEDs are arranged within the housing 21 so as to correspond to the plural near-ultraviolet ray irradiating ports 26a.

In the structure of this example, the near-ultraviolet ray can be irradiated to resin coated in an elongated area at one time by the plural LEDs arranged in the longitudinal direction and can be cured. Further, a cooling effect using the flow of the nitrogen gas as mentioned above is also obtained. The nitrogen gas injected from the gas injection port 25a of the slit shape is blown to the resin to be cured as in a so-called air curtain.

Figure 5C:
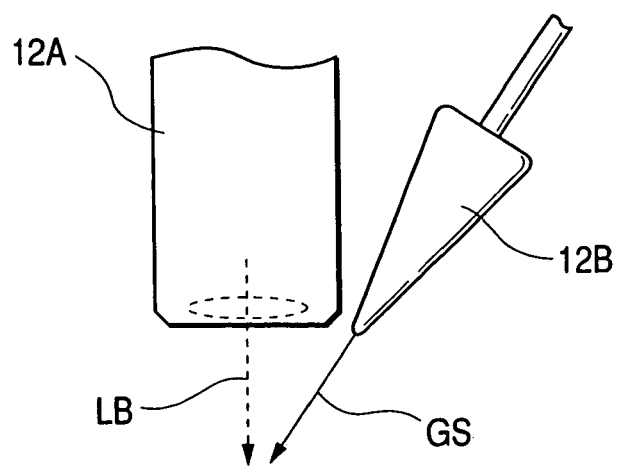

The example shown in FIG. 5C is slightly different from the structural example of the head portion already described. In this example, the head portion is separated into a head portion 12A for irradiating the near-ultraviolet ray and a head portion 12B for injecting the nitrogen gas. In such a construction, it is also possible to execute the curing method of the ultraviolet curable resin of the present invention for injecting the nitrogen gas simultaneously with the injection of the near-ultraviolet ray from the LED to the resin to be cured. However, in this case, when the generation heat of the LED built in the head portion 12A for irradiating the near-ultraviolet ray is large, a structure for cooling this LED is separately required.

Figure 6:
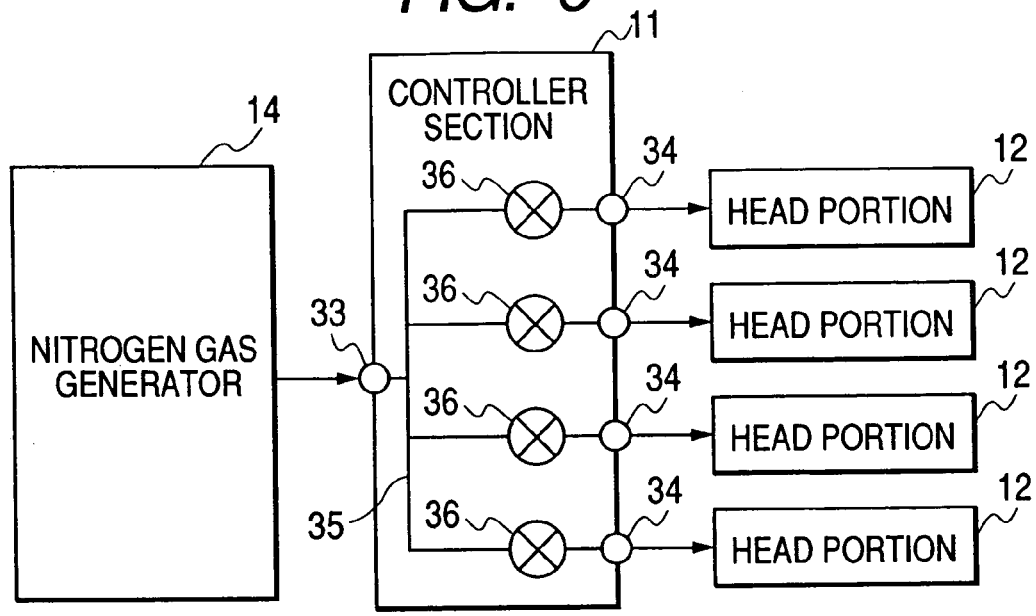
FIG. 6 is a block diagram showing a constructional example for supplying nitrogen gas to plural head portions through a controller section.

FIG. 6 is a block diagram showing a structural example for supplying the nitrogen gas to the plural head portions 12 through the controller section 11. In this example, the controller section 11 has one nitrogen gas input port 33 and four nitrogen gas output ports 34. The nitrogen gas is supplied from the nitrogen gas generator 14 to the nitrogen gas input port 33. Four head portions 12 are respectively connected to the four nitrogen gas output ports 34.

A branch connecting pipe 35 for branching and connecting the nitrogen gas input port 33 and the four nitrogen gas output ports 34 is built in. Further, four electromagnetic valves 36 for individually controlling opening and closing of the four nitrogen gas output ports 34 are arranged. The turning on and off operations of the four electromagnetic valves 36 are controlled by a control circuit (see FIG. 1) built in the controller section 11.

In accordance with such a structure, the nitrogen gas from the nitrogen gas generator 14 is supplied to the four head portions 12 through the controller section 11, and the supply of the nitrogen gas to the four head portions 12 can be individually controlled by the individual control of the four electromagnetic valves 36. Namely, timing for injecting the nitrogen gas from each head portion 12 can be individually controlled. When the on-off timing of the near-ultraviolet ray irradiated from the four head portions 12 is individually controlled by an electric signal from the controller section 11 as described later, the injection timing of the nitrogen gas can be also individually controlled in conformity with this on-off timing.

Figure 7:
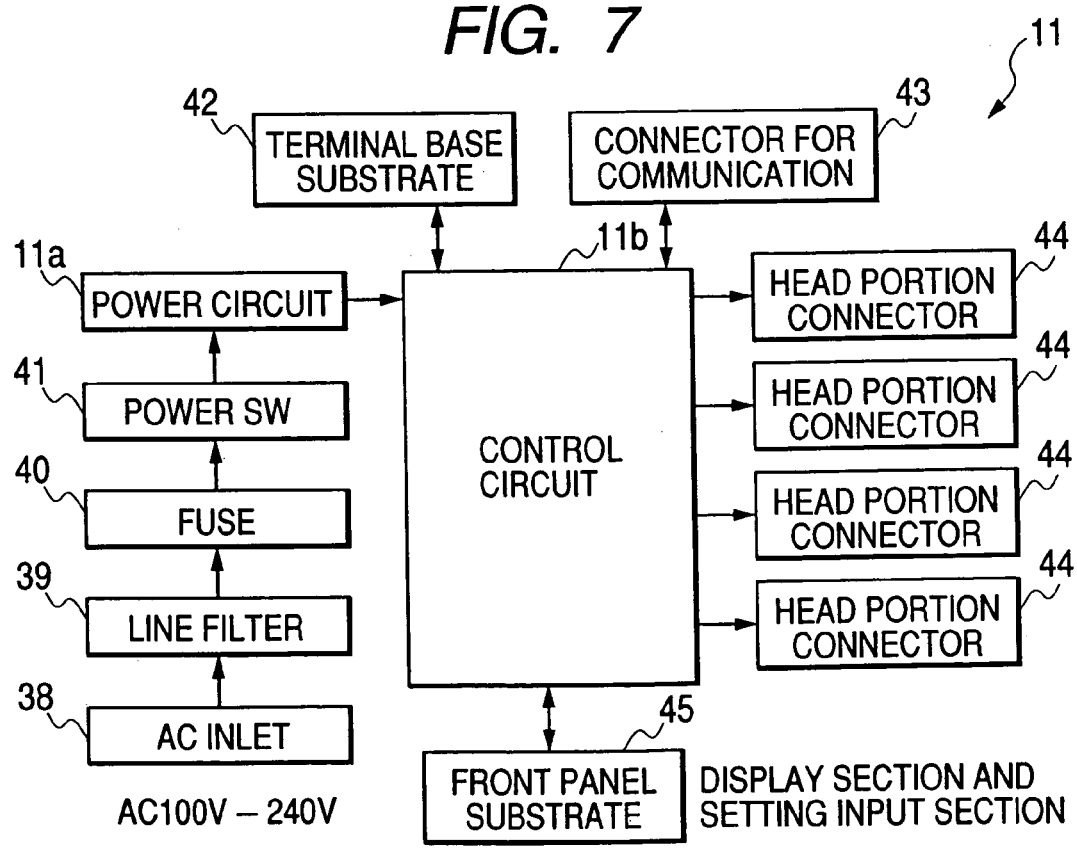
FIG. 7 is a block diagram showing a constructional example of an electric system including a power circuit and a control circuit built in the controller section.

FIG. 7 is a block diagram showing a constructional example of an electric system including the power circuit 11a and the control circuit 11b built in the controller section 11. In FIG. 7, commercial power supplied from an AC inlet 38 is supplied to the power circuit 11a via a line filter 39, a fuse 40 and a power switch 41, and a stabilized direct current voltage generated by the power circuit 11a is supplied to the control circuit 11b. The control circuit 11b has a microcomputer, an EEPROM (memory), etc., and controls the intensity of the near-ultraviolet ray from each head portion 12, irradiation timing, injection timing of the nitrogen gas, etc. in accordance with a program stored in advance and a setting operation of a user.

A terminal base substrate 42 and a connector (RS232C) 43 for communication are connected to the control circuit 11b. An external controller such as a personal computer, a PLC (programmable logic controller), etc. can be connected to the controller section 11 by using these interfaces.

Further, four head portion connectors 44 are connected to the control circuit 11b, and the respective head portions 12 are connected to the control circuit 11b of the controller section 11 through these head portion connectors 44. The control circuit 11b gives an electric signal for controlling the operation of the LED 22 of each head portion 12 to each head portion 12, and controls the intensity of the near-ultraviolet ray from each head portion 12 and the irradiation timing. The injection timing of the nitrogen gas is controlled by individually controlling the operations of the four electromagnetic valves 36 built in the controller section 11 as mentioned above.

Further, a front panel substrate 45 is connected to the control circuit 11b. A liquid crystal display unit constituting a display section and an operating section arranged in a front face panel of the controller section 11, and various kinds of switch groups are mounted to this front panel substrate 45. A user can individually set the intensity of the near-ultraviolet ray of the four head portions 12, the irradiation timing, the injection timing of the nitrogen gas, etc. by using the display section and the operating section.

Figure 8:
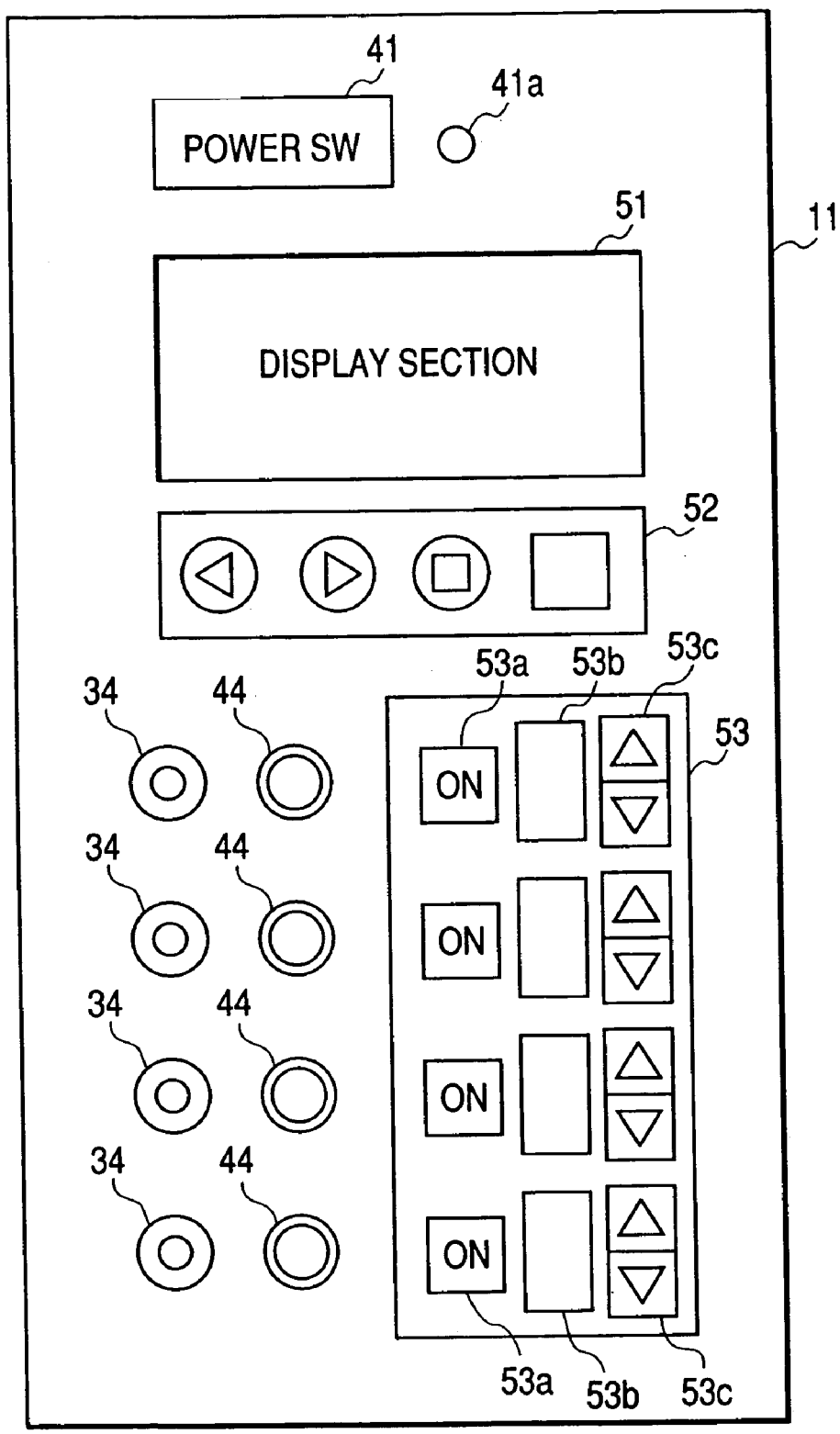
FIG. 8 is a view showing an arrangement example of a display section and an operating section arranged in a front face panel of the controller section.

FIG. 8 is a view showing an arrangement example of the display section and the operating section arranged in the front face panel of the controller section 11. A power switch 41 and a pilot lamp 41a are arranged in an uppermost portion of the front face panel. The display section 51 using a liquid crystal display unit is arranged below the power switch 41 and the pilot lamp 41a. A first operating section 52 having various kinds of key switches for setting is arranged below the display section 51. Four pairs of nitrogen gas output ports 34 connected to nitrogen gas tubes 24 and wire harnesses 23 of the four head portions 12, and head portion connectors 44 are arranged on the left-hand side below the first operating section 52.

A second operating section 53 is arranged on the right-hand side of the four pairs of nitrogen gas output ports 34 and head portion connectors 44. The second operating section 53 has four sets of on-off switches 53a, 7-segment display units 53b and (up-down) switches 53c for setting an increase and a decrease arranged correspondingly on the right-hand side of the nitrogen gas output ports 34 and the head portion connectors 44 of the respective head portions 12.

The on-off switch 53a is a switch for individually setting the irradiation (i.e., on-off of the LED 22) of the near-ultraviolet ray from each head portion 12. A push button switch with a back light lighted in the on-state is used.

The 7-segment display unit 53b and the switch 53c for setting an increase and a decrease are used to set the intensity (drive duty factor of the LED 22) of the near-ultraviolet ray irradiated from each head portion 12. A value increasingly and decreasingly set is displayed in the 7-segment display unit 53b by using the switch 53c for setting an increase and a decrease.

On-off of the near-ultraviolet ray irradiated from each head portion 12 can be individually set by using the second operating section 53 as mentioned above, and can be also collectively set by using the first operating section 52 and the display section 51. Further, on timing (delay setting) and off timing (delay setting) of the near-ultraviolet ray can be individually set by using the first operating section 52 and the display section 51.

[Embodiment 2]

Figure 9:
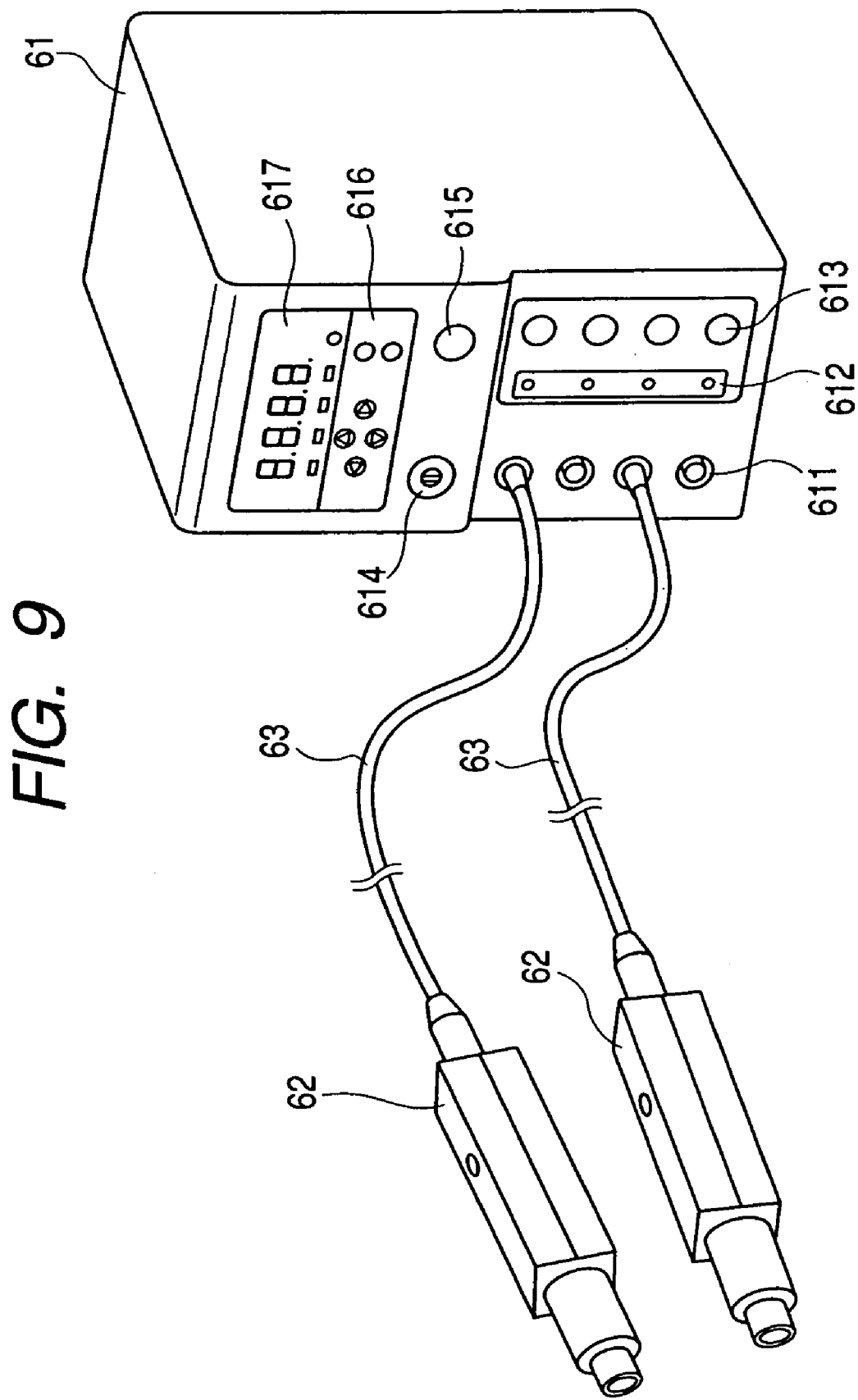
FIG. 9 is a view showing the external appearance of an ultraviolet irradiating device in accordance with an embodiment 2 of the present invention.

FIG. 9 is a view showing the external appearance of an ultraviolet irradiating device in accordance with an embodiment 2 of the present invention. In the ultraviolet irradiating device of this embodiment, four head portions 62 at its maximum can be connected to one controller section 61. Four connectors 611 for cable connection are longitudinally arranged in parallel with each other on the left-hand side of the lower portion of a front face panel of the controller section 61, and are sequentially set to channels 1, 2, 3 and 4 from above. In the illustrated example, a head portion 62 is connected to channels 1 and 3 through an electric cable 63. No injecting function of the nitrogen gas is provided in the head portion 62 of the ultraviolet irradiating device of this embodiment. The controller section 61 and the head portion 62 are connected by only the electric cable 63.

Four indicators 612 and four push button switches 613 are respectively longitudinally arranged in parallel with each other on the right-hand side of the lower portion of the front face panel of the controller section 61 correspondingly to the connectors of the four channels longitudinally arranged in parallel with each other on the left-hand side. The irradiating operation of the ultraviolet ray from the head portions 62 of the four channels can be individually performed and stopped by the four push button switches 613. The operating or stopping state of the ultraviolet ray irradiation of each head portion 62 is individually displayed by the four indicators 612.

A key switch 614 is arranged on the left-hand side of the central portion of the front face panel of the controller section 61, and a power switch (push button switch) 615 is arranged on the right-hand side. A setting operation section 616 and a display section 617 are arranged on the upper side of the key switch 614 and the power switch 615. Plural push button switches are arranged in the setting operation section 616, and irradiating power an irradiating time and an irradiating pattern of the ultraviolet ray of each head portion 62 can be individually set by using these switches. Continuous irradiation in constant irradiation power, continuous irradiation in constant ratio raising irradiation power, interval irradiation or continuous irradiation in irradiation power changed in a quadratic curve shape can be selected as the irradiating pattern. In the setting, the display of four digits and seven segments of the display section 617 and the indicators of the four channels below this display are referred.

Figure 10:
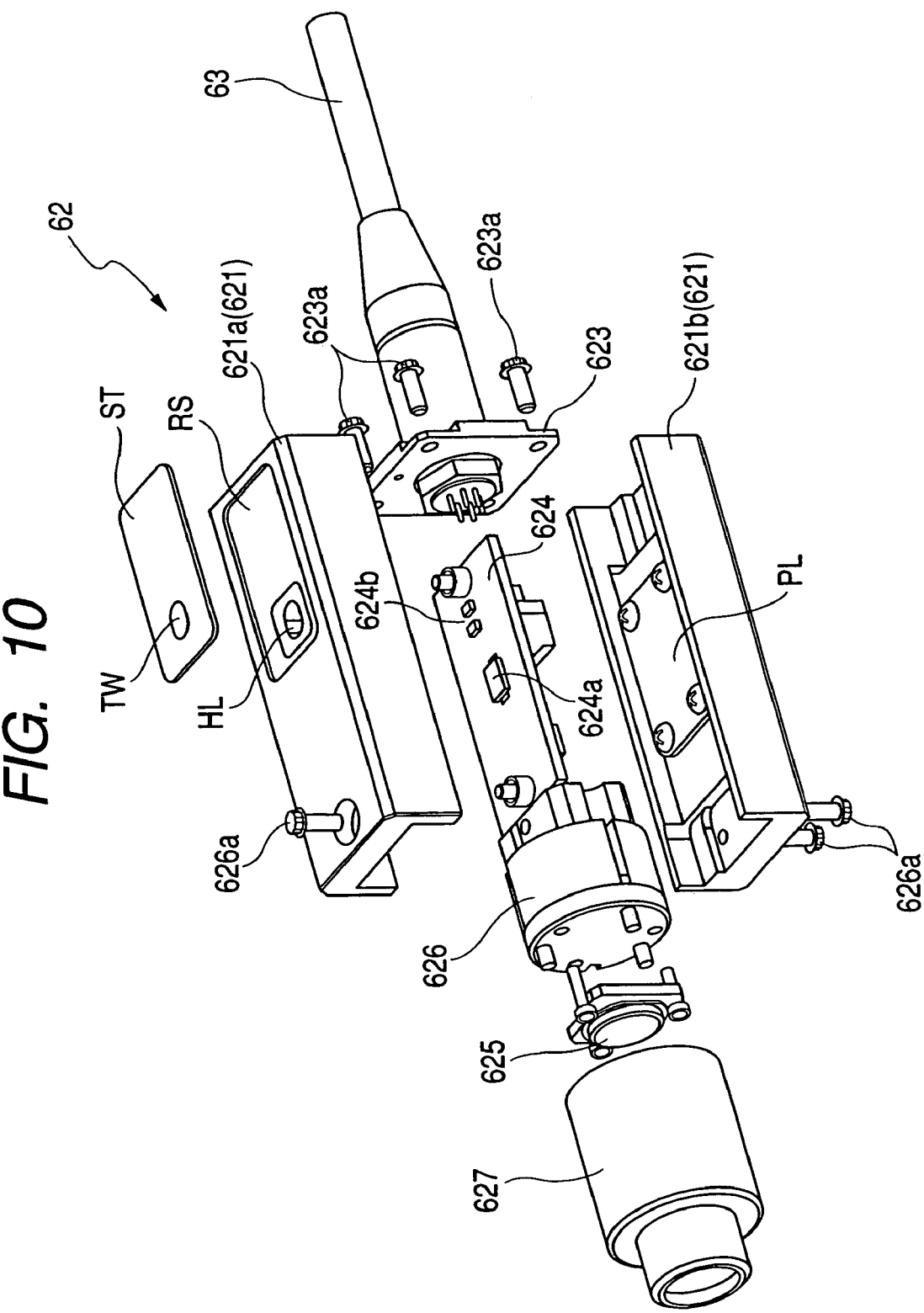
FIG. 10 is an upper face exploded perspective view showing the structure of a head portion of the ultraviolet irradiating device in accordance with the embodiment 2 of the present invention.
Figure 11:
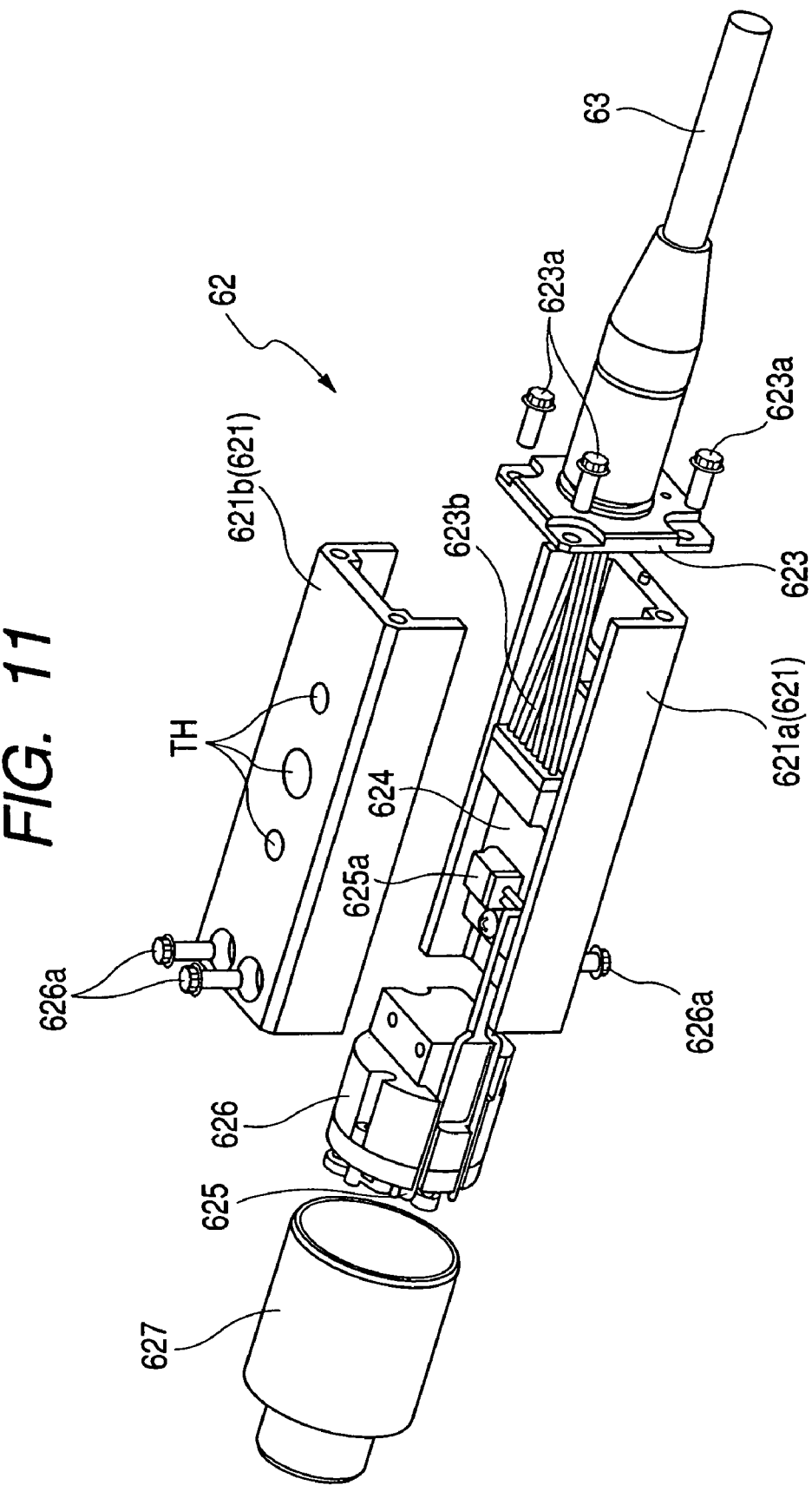
FIG. 11 is a lower face exploded perspective view showing the structure of the head portion of the ultraviolet irradiating device in accordance with the embodiment 2 of the present invention.

FIG. 10 is an upper face exploded perspective view showing the structure of the head portion 62 of the ultraviolet irradiating device in accordance with the embodiment 2 of the present invention. FIG. 11 is a lower face exploded perspective view similarly showing the structure of the head portion 62. The head portion 62 is constructed by an upper case 621a, a lower case 621b, a cable connector 623, a printed wired board 624, an ultraviolet ray light emitting diode 625 and its cooling block 626, a lens holder 627, etc. The printed wired board 624 is stored into a sleeve-shaped case 621 able to be formed by combining the upper case 621a and the lower case 621b. The cable connector 623 is fixed to the base end side of the sleeve-shaped case 621 by four fixing screws 623a. Further, the cooling block 626 fixing the ultraviolet ray light emitting diode 625 thereto is fixed to the tip side of the sleeve-shaped case 621 by three fixing screws 626a.

As shown in FIG. 11, the cable connector 623 fixed to the base end side of the sleeve-shaped case 621 is connected to the printed wired board 624 through a wire harness 623b. Namely, the electric cable 63 for connection with the controller section 61 is connected to the printed wired board 624 through the cable connector 623 and the wire harness 623b. Further, a lead wire of the ultraviolet ray light emitting diode 625 fixed to the tip side of the cooling block 626 fixed to the tip side of the sleeve-shaped case 621 is connected to the printed wired board 624 through a connector 625a.

As shown in FIG. 10, a surface mounting part such as a nonvolatile memory 624a, a chip LED 624b, etc. is mounted to a soldering face of the printed wired board 624 as a circuit part. The nonvolatile memory 624a is used in the integration of an accumulating driving time of the ultraviolet ray light emitting diode 625, the memory of initial brightness characteristics, etc. The chip LED 624b is lighted during the operation of the ultraviolet ray light emitting diode 625, i.e., during the irradiation of the ultraviolet ray, and informs a user of these contents. A small hole HL is formed in the upper case 621a so as to visually recognize the turning on or off state of this chip LED 624b from the exterior. A shallow concave portion RS is formed in an upper face portion including the small hole HL of the upper case 621a. A resin sheet (decorative sheet) ST having a transparent window TW formed in a portion corresponding to the small hole HL is stuck to the concave portion RS and blocks the small hole HL.

As shown in FIG. 11, a screw hole TH for fixation is formed in the central portion of the lower case 621b. The head portion 62 can be fixed to a jig and an equipment group by using this screw hole TH. The screw hole TH is set to a through hole since the thickness of the lower case 621b is thin. As shown in FIG. 10, a plate PL is fixed to the inner face of the lower case 621b. This plate PL has the operation of a stopper for preventing that a male screw screwed and inserted into the screw hole TH in the fixation of the head portion 62 enters into the sleeve-shaped case 621.

[Embodiment 3]

A construction for extending the connecting distance of the controller section and the head portion by using a relay will next be explained as an embodiment 3. As mentioned above, the ultraviolet irradiating device of the present invention has a light source (ultraviolet ray light emitting diode) in each head portion, and the controller section and the head portion are connected by the electric cable. Accordingly, the ultraviolet irradiating device of the present invention can lengthen the connecting distance of the controller section and the head portion in comparison with the conventional ultraviolet irradiating device in which the light source is arranged in the main body portion and the ultraviolet ray is guided until each head portion by using an optical fiber. However, there is a limit in this connecting distance since an electric signal is attenuated. On the other hand, there is a case in which the connecting distance exceeding seven ten meters is required in accordance with uses.

Figure 12:
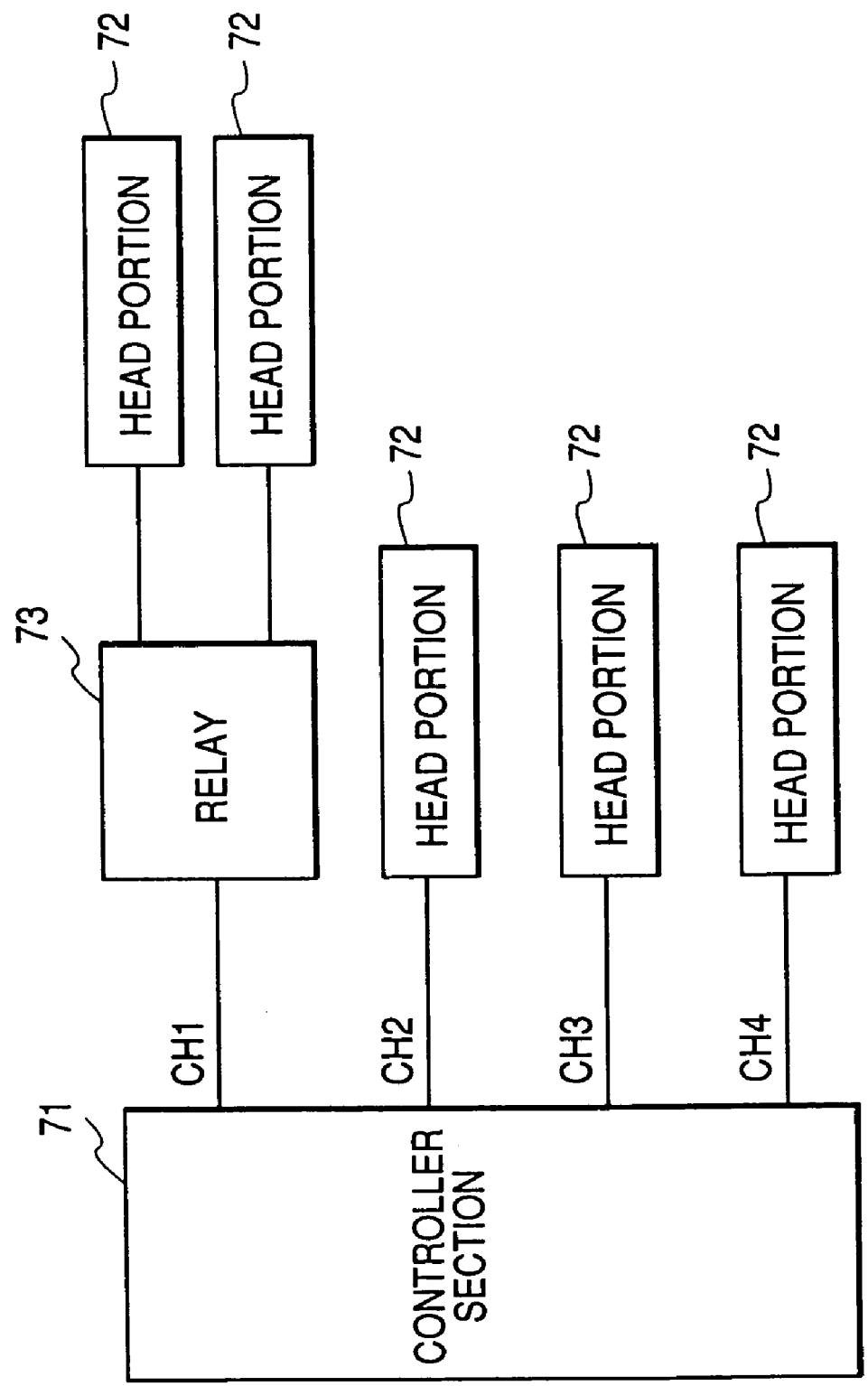
FIG. 12 is a view showing a constructional example of an ultraviolet irradiating device in accordance with an embodiment 3 of the present invention.

Therefore, in the ultraviolet irradiating device of the embodiment 3, as shown in FIG. 12, the signal is amplified by using a relay to realize an increase in the distance of wiring of the controller section and the head portion. In the example shown in FIG. 12, one head portion 72 is connected to each of channels CH2 to CH4 among four channels CH1 to CH4 arranged in the controller section 71 as usual. However, two head portions 72 are connected to the channel CH1 through a relay 73. The wiring (connecting distance) can be extended by connecting the controller section 71 and the head portion 72 through the relay 73 in this way, and the number of head portions 72 able to be connected to one controller section 71 can be also increased. Power for operating the relay 73 may be supplied from the controller section 71 and may be also directly supplied from the exterior.

Figure 13A:
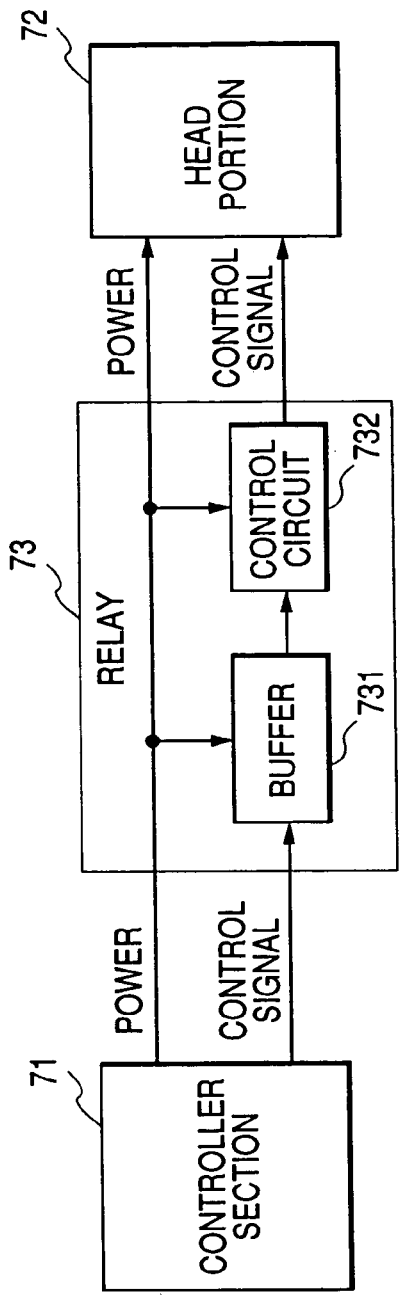
FIG. 13A is a constructional view when power is supplied from a controller section to a relay in the ultraviolet irradiating device of the embodiment 3.
Figure 13B:
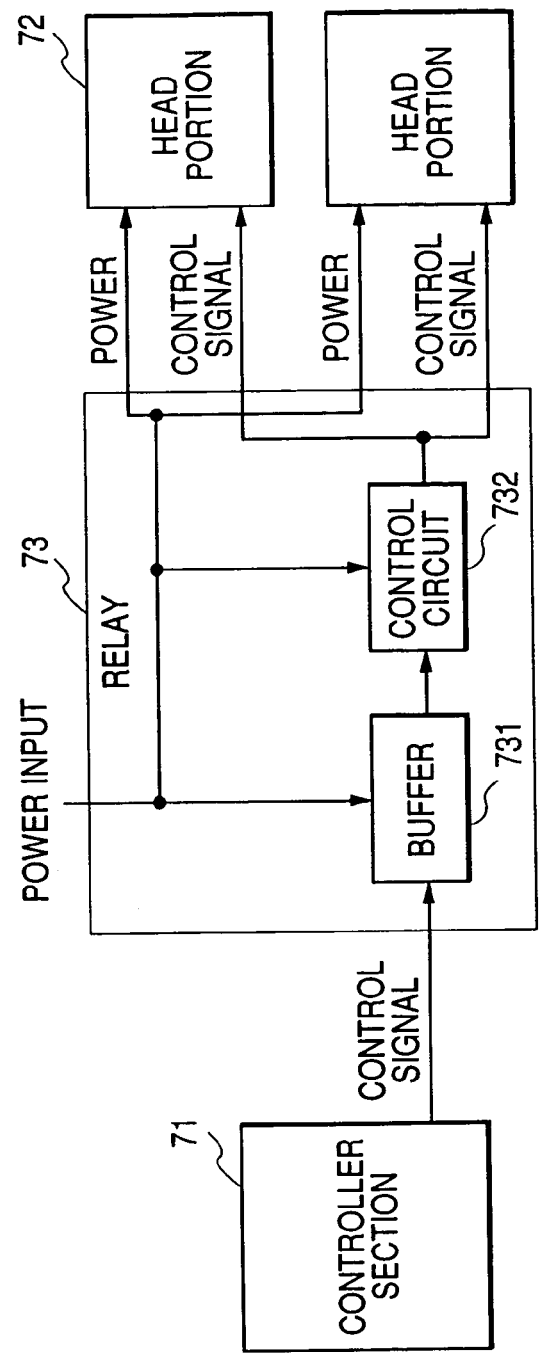
FIG. 13B is similarly a constructional view when power is supplied from the exterior to the relay in the ultraviolet irradiating device of the embodiment 3.

FIG. 13A shows the construction of the ultraviolet irradiating device of the embodiment 3 when power is supplied from the controller section 71 to the relay 73. FIG. 13B similarly shows the construction when power is supplied from the exterior to the relay 73. In the construction of FIG. 13A, one head portion 72 is connected to the relay 73. In the construction of FIG. 13B, two head portions 72 are connected to the relay 73 (branching connection). In each of these constructions, a buffer 731 and a control circuit 732 are arranged within the relay 73, and power is supplied to each of the buffer 731 and the control circuit 732. The wiring between the controller section 71 and the relay 73 is performed by one electric cable, and the wiring between the relay 73 and the head portion 72 is also performed by one electric cable. A power line and a control signal line are collected as one electric cable. No power line is used with respect to the electric cable between the controller section 71 and the relay 73 in the construction of FIG. 13B.

Figure 14A:
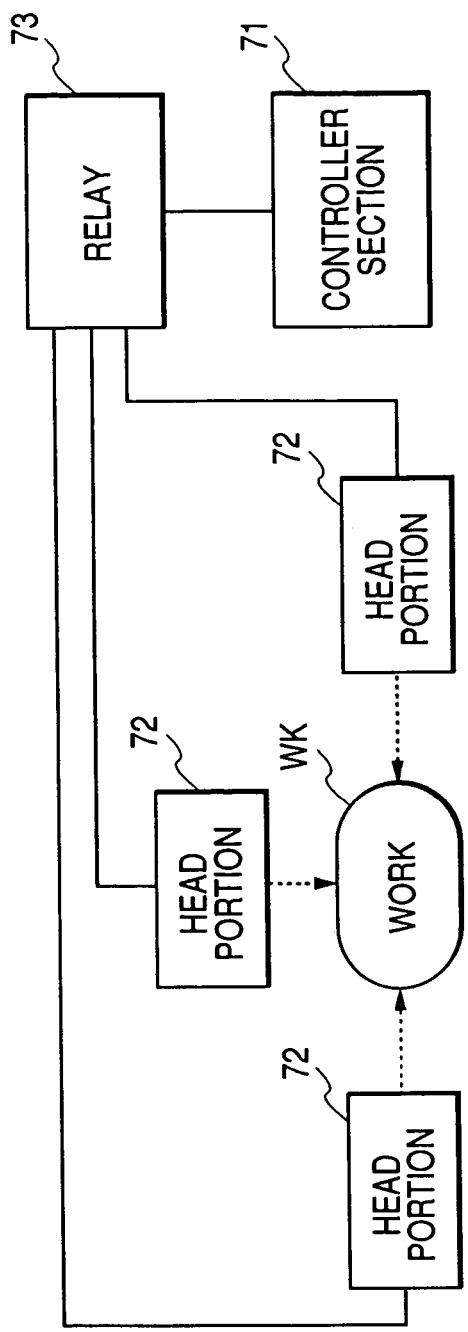
FIGS. 14A and 14B are views showing using examples of the ultraviolet irradiating device of the embodiment 3.

FIG. 14 is a view showing a using example of the ultraviolet irradiating device of the embodiment 3. FIG. 14A shows a case in which the ultraviolet ray is simultaneously irradiated to plural portions of one work WK in the same condition and the work WK is fixed by using an ultraviolet curable resin. In such a case, since the ultraviolet ray is irradiated in the plural (three in FIG. 14A) head portions 72 connected to one relay 73 in the same condition, the construction of this embodiment can be used. The ultraviolet ray can be simultaneously irradiated to the plural portions of the work WK in the same condition by directly connecting the plural head portions 72 to the controller section 71. However, in this case, it is necessary to set all the plural channels connected to the plural head portions 72 to the same irradiating condition. In contrast to this, in the construction of FIG. 14A, it is sufficient to simply set a channel connected to the relay 73 to a predetermined irradiating condition.

Figure 14B:
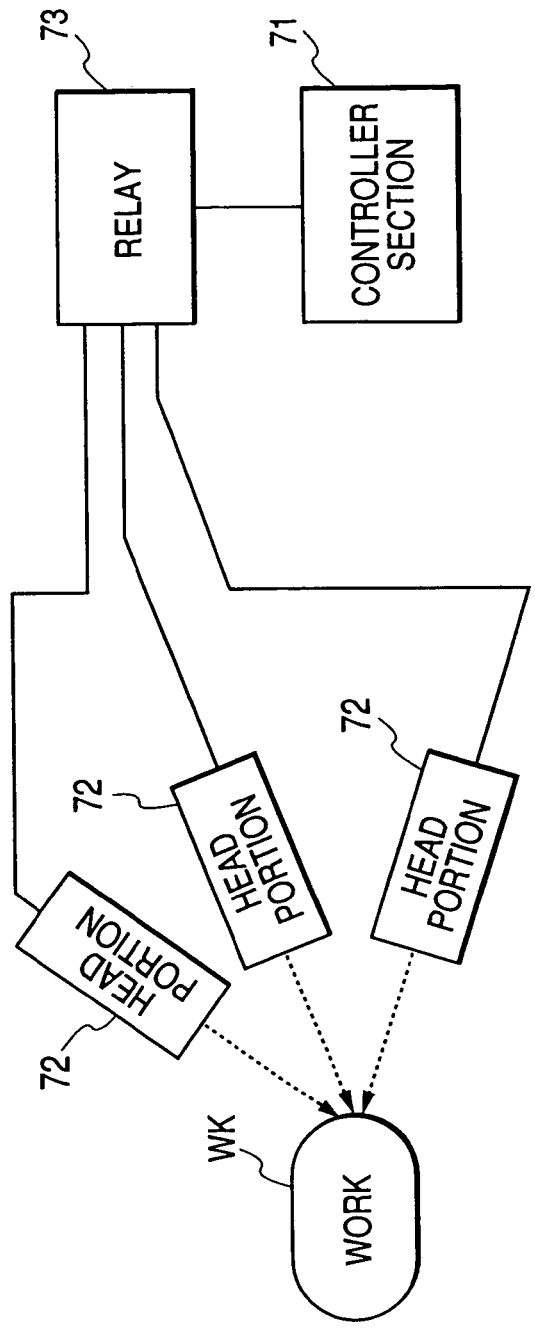

FIG. 14B shows a construction used when the ultraviolet rays from the plural head portions 72 are concentrated into one specific portion of the work WK. Thus, the ultraviolet ray can be irradiated with large irradiating power in comparison with a case in which the ultraviolet ray is irradiated by only one head portion 72. As its result, there is a case in which the curing time can be shortened and the curing strength can be improved.

As mentioned above, the present invention has been explained by using some embodiments and modified examples. However, the present invention is not limited to the above embodiments and modified examples, but can be executed in various modes. For example, the present invention may be also constructed such that the nitrogen gas from the nitrogen gas generator 14 is supplied to the plural head portions 12 directly (through a branch connecting pipe) without interposing the controller section 11 instead of the construction in which the nitrogen gas is supplied to the plural head portions 12 through the controller section 11.

Further, another inactive gas (argon, etc.) may be also used instead of the nitrogen gas blown to the near-ultraviolet ray irradiating portion of the resin to be cured. Further, the present invention may be also constructed such that the nitrogen gas (inactive gas) is supplied from a gas bomb instead of the nitrogen gas (inactive gas) generator.

What is claimed is:

1. An ultraviolet irradiating device comprising:
a plurality of head portions used to cure an ultraviolet curable resin;
a controller section which controls each of said head portions; and
a plurality of electric cables, at least one of said cables connecting at least one of said head portions and said controller section,
wherein each of said head portions has a housing and a light emitting diode which is arranged within said housing and emits ultraviolet light, and wherein said controller section has a power circuit and a control circuit for individually controlling operations of said light emitting diodes of said head portions said control circuit individually adjusting an irradiating time as well as an irradiating power of said plurality of head portions.

2. The ultraviolet irradiating device according to claim 1, wherein each of said plurality of head portions further has a gas flow passage arranged within said housing and a gas injection port arranged on the tip face of said housing, and wherein an inactive gas supplied from a base end face of said housing passes through said gas flow passage to an exterior of said housing.

3. The ultraviolet irradiating device according to claim 2, wherein said controller section has one inactive gas input port, plural inactive gas output ports, and a branch connecting pipe for branching and connecting said inactive gas input port and the plural inactive gas output ports, and wherein the inactive gas supplied from a supply source of the inactive gas is supplied to said plurality of head portions through said controller section.

4. The ultraviolet irradiating device according to claim 3, wherein said controller section further has an electromagnetic valve for individually controlling opening and closing of said plural inactive gas output ports.

5. The ultraviolet irradiating device according to claim 1, wherein said housing includes a cooling block provided therein and said light emitting diode is fixed to said cooling block.

6. The ultraviolet irradiating device according to claim 5, further comprising a substrate having a nonvolatile memory storing at least one of the integrated value of the accumulating driving time of said light emitting diode and the initial brightness characteristic is provided at an opposite side of said cooling block of said light emitting diode within said housing.

7. The ultraviolet irradiating device according to claim 1, further comprising an indicator light provided on said housing, said indicator light being activated during the driving of said light emitting diode.

8. The ultraviolet irradiating device according to claim 1, wherein said lens holder includes an inner circumferential surface having a screw portion and said housing includes an outer circumferential surface having another screw portion, and said screw portion and said another screw portion are attached to each other.

9. The ultraviolet irradiating device according to claim 1, wherein said controller section has a setting section which can individually set the irradiating power and the irradiating timing of the ultraviolet light for each of said head portions, and a display section which displays a setting value set by said setting section.

10. The ultraviolet irradiating device according to claim 9, wherein said controller section is provided with a plurality of connectors for connecting said electric cables, and each of said connectors is provided with a switch for starting and stopping the irradiation of the ultraviolet light from the corresponding head portion connected to said connector.

11. The ultraviolet irradiating device according to claim 1, wherein said controller section has a power circuit and a control circuit for individually controlling the operations of said light emitting diodes of said head portions based on the irradiating power and the irradiating time of the ultraviolet light and also an irradiating pattern selected from a plurality of irradiating patterns.

12. The ultraviolet irradiating device according to claim 1, further comprising a plurality of detachable lens holders, each of said plurality of detachable lens holders including a lens having a different focal length, each of said plurality of detachable lens holders being connected to each of said head portions so as to allow the ultraviolet light emitted from said light emitting diode to pass to the outside.

13. The ultraviolet irradiating device according to claim 1, further comprising a terminal base substrate which is connected to the control circuit of said controller section, so that onoff timing of the ultraviolet light is controlled based on an output of an external controller via said terminal base substrate.

14. The ultraviolet irradiating device according to claim 1, further comprising a connector for communication, said connector being connected to the control circuit of said controller section.

15. The ultraviolet irradiating device according to claim 1, wherein said controller section includes a power switch and a plurality of push button switches for respectively operating and stopping the ultraviolet light of said plurality of head portions.

16. The ultraviolet irradiating device according to claim 1, wherein said each of said head portions includes a nonvolatile memory storing at least one of an integrated value of accumulating driving time of said light emitting diode and an initial brightness characteristic, and the ultraviolet light emitted from said light emitting diode is irradiated from a ultraviolet irradiation hole provided at a front end surface of said housing to the outside.

17. An ultraviolet irradiating device comprising:
a plurality of head portions used to cure an ultraviolet curable resin;
a controller section which controls each of said head portions; and
a plurality of electric cables, at least one of said cables connecting at least one of said head portions and said controller section,
wherein each of said head portions has a housing and a light emitting diode which is arranged within said housing and emits ultraviolet light, and
wherein said controller section individually adjusts an irradiating time as well as an irradiating power of said plurality of head portions, whereby said ultraviolet irradiating device can be used for irradiating ultraviolet light to a plurality of objects.

18. The ultraviolet irradiating device according to claim 17, wherein said housing includes a cooling block provided therein and said light emitting diode is fixed to said cooling block.

19. The ultraviolet irradiating device according to claim 17, further comprising an indicator light provided on said housing, said indicator light being activated during the driving of said light emitting diode.

20. The ultraviolet irradiating device according to claim 17, wherein said controller section has a setting section which can individually set the irradiating power and the irradiating timing of the ultraviolet light for each of said head portions, and a display section which displays a setting value set by said setting section.

21. The ultraviolet irradiating device according to claim 20, wherein said controller section is provided with a plurality of connectors for connecting said electric cables, and each of said connectors is provided with a switch for starting and stopping the irradiation of the ultraviolet light from the corresponding head portion connected to said connector.

22. The ultraviolet irradiating device according to claim 17, wherein said controller section has a power circuit and a control circuit for individually controlling the operations of said light emitting diodes of said head portions based on the irradiating power and the irradiating time of the ultraviolet light and also an irradiating pattern selected from a plurality of irradiating patterns.

23. The ultraviolet irradiating device according to claim 17, further comprising a terminal base substrate which is connected to a control circuit of said controller section, so that on-off timing of the ultraviolet light is controlled based on an output of an external controller via said terminal base substrate.

24. The ultraviolet irradiating device according to claim 17, further comprising a connector for communication, said connector being connected to a control circuit of said controller section.

25. The ultraviolet irradiating device according to claim 17, wherein said controller section includes a power switch and a plurality of push button switches for respectively operating and stopping the ultraviolet light of said plurality of head portions.

26. The ultraviolet irradiating device according to claim 17, wherein said each of said head portions includes a nonvolatile memory storing at least one of an integrated value of accumulating driving time of said light emitting diode and an initial brightness characteristic, and the ultraviolet light emitted from said light emitting diode is irradiated from a ultraviolet irradiation hole provided at a front end surface of said housing to the outside.

27. The ultraviolet irradiating device according to claim 17, further comprising a plurality of detachable lens holders, each of said plurality of detachable lens holders including a lens having a different focal length, each of said plurality of detachable lens holders being connected to each of said head portions so as to allow the ultraviolet light emitted from said light emitting diode to pass to the outside.

* * * * *